(12) United States Patent
Niemoeller et al.

(10) Patent No.: US 8,972,935 B2
(45) Date of Patent: Mar. 3, 2015

(54) APPLICATION SERVER AND METHOD FOR MANAGING A SERVICE

(75) Inventors: Joerg Niemoeller, Sundbyberg (SE); Roman Levenshteyn, Aachen (DE); Eugen Freiter, Berlin (DE); Raphael Quinet, Liège (BE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 266 days.

(21) Appl. No.: 13/511,250

(22) PCT Filed: Jul. 13, 2010

(86) PCT No.: PCT/EP2010/060060
§ 371 (c)(1),
(2), (4) Date: Jul. 25, 2012

(87) PCT Pub. No.: WO2011/064001
PCT Pub. Date: Jun. 3, 2011

(65) Prior Publication Data
US 2013/0046812 A1    Feb. 21, 2013

Related U.S. Application Data

(60) Provisional application No. 61/264,345, filed on Nov. 25, 2009.

(51) Int. Cl.
*G06F 9/44* (2006.01)
*G06F 9/445* (2006.01)

(52) U.S. Cl.
CPC *G06F 8/36* (2013.01); *G06F 8/316* (2013.01); *G06F 9/44521* (2013.01)
USPC ............ 717/121; 717/120; 717/114; 717/162

(58) Field of Classification Search
None
See application file for complete search history.

(56) References Cited

U.S. PATENT DOCUMENTS

| | | | |
|---|---|---|---|
| 2001/0007976 A1* | 7/2001 | Thompson et al. | 705/7 |
| 2003/0149959 A1* | 8/2003 | Lamping | 717/116 |
| 2005/0204344 A1* | 9/2005 | Shinomi | 717/124 |
| 2006/0080640 A1* | 4/2006 | Cheng et al. | 717/120 |
| 2006/0129880 A1* | 6/2006 | Arcese et al. | 714/11 |
| 2006/0150141 A1* | 7/2006 | Hong et al. | 717/105 |
| 2007/0022409 A1* | 1/2007 | Levenshteyn | 717/136 |

(Continued)

FOREIGN PATENT DOCUMENTS

EP    1074911 A2    2/2001

OTHER PUBLICATIONS

Popovici et al., "Just-In-Time Aspects: Efficient Dynamic Weaving for Java," ACM, 2003.*

(Continued)

*Primary Examiner* — Insun Kang
(74) *Attorney, Agent, or Firm* — Coats and Bennett, PLLC

(57) ABSTRACT

An application server (102) along with various other devices and method are described herein for managing a service (e.g., communication service) which is provided to a user. As described herein, the application server with the help of aspect oriented programming is capable of automatically adding functionality to an original service without directly modifying the target application code of the original service. In particular, the application server when automatically adding functionality to a certain application can automatically detect which features are still missing within the certain application, and which are already supported.

33 Claims, 3 Drawing Sheets

(56) References Cited

U.S. PATENT DOCUMENTS

| | | | |
|---|---|---|---|
| 2008/0034372 A1* | 2/2008 | Ganesan et al. | 719/311 |
| 2008/0126974 A1* | 5/2008 | Fawcett et al. | 715/772 |
| 2008/0134160 A1* | 6/2008 | Belapurkar et al. | 717/154 |
| 2008/0168422 A1* | 7/2008 | Cheng et al. | 717/114 |
| 2008/0209388 A1* | 8/2008 | Llanso et al. | 717/101 |
| 2009/0119653 A1* | 5/2009 | Kettley et al. | 717/151 |
| 2010/0138815 A1* | 6/2010 | Schneider | 717/141 |
| 2010/0218261 A1* | 8/2010 | Schneider | 726/27 |
| 2011/0126177 A1* | 5/2011 | Charters et al. | 717/136 |
| 2014/0109045 A1* | 4/2014 | Kew et al. | 717/116 |

OTHER PUBLICATIONS

Janssens et al., "Adding Dynamic Reconfiguration Support to JBoss AOP," ACM, 2007.*

Mei et al., "An Agent-based Approach to Composing Web Services to Support Adaptable Business Processes," Peking University, 2007.*

Cacho et al., "AspectLua—A Dynamic AOP Approach," Journal of Universal Computer Science, vol. 11, No. 7, 2005.*

Feng, "Generative Aspect-oriented Component Adaptation," Napier University, Apr. 2008.*

Truyen et al., "Run-time and Atomic Weaving of Distributed Aspects," Springer-Verlag Berlin Heidelberg 2006, pp. 147-181.*

Song et al., "Dynamic Aspects Weaving in Service Composition," IEEE, 2006.*

Mendonca et al., "A Unified Model for Service- and Aspect-Oriented Software Development," International Journal of Web Services Practices, vol. 2, No. 1-2 (2006), pp. 59-67.*

Cacho et al., "AspectLua—A Dynamic AOP Approach," Journal of Universal Computer Science, vol. 11, No. 7 (2005), 1177-1197.*

Charfi et al., "An Aspectbased Process Container for BPEL," ACM 2005.*

Song, H. et al. "Dynamic Weaving of Security Aspects in Service Composition." Proceedings of the Second IEEE International Symposium on Service-Oriented System Engineering (SOSE '06), Oct. 2006, pp. 189-196.

Cibran, M. et al. "Aspect-Oriented Programming for Dynamic Web Service Selection, Integration and Management." World Wide Web; Internet and Web Information Systems, Mar. 27, 2007, pp. 211-242, vol. 10, No. 3, Kluwer Academic Publishers.

Nicoara, A. et al. "Dynamic AOP with Prose." 2005, [Retrieved on Sep. 15, 2010]. Retrieved from the Internet<URL: http://www.iks.inf.ethz.ch/publications/publications/files/PROSE-ASMEA05.pdf>.

Toyota, Y. et al. "Determining the Weaving Point at Compile-Time for Dynamic Aspect-Oriented Programming." IPSJ SIG Report, Information Processing Society of Japan, Jun. 18, 2004, vol. 2004, No. 63, pp. 73-80.

Akahori, F. et al. "A Framework of Testing Application Order of Advices in Aspect-Oriented Programming." IEICE Technical Report, The Institute of Electronics, Information and Communication Engineers, Nov. 20, 2008, vol. 108, No. 326, pp. 55-59.

Minamoto, F. "Chapter 1, Introduction of Open Source J2EE Server JBoss." WEB+DB Press, Gijutsu-Hyohron Co., Ltd., Sep. 20, 2003, vol. 16, pp. 48-53.

Wada, H. "Follow up! Aspect-Oriented Programming." Java WORLD, IDG Japan Inc., Apr. 1, 2004, vol. 8, No. 4, pp. 81-91.

Nakamura, T. "Chapter 1, AspectJ." JAVA PRESS, Gijutsu-Hyohron Co., Ltd., Feb. 15, 2003, vol. 28, pp. 2-11.

Japanese Office Action dated Apr. 7, 2014 for JP Patent Application No. 2012-540329, publication date Apr. 11, 2013.

* cited by examiner

APPLICATION SERVER AND METHOD FOR MANAGING A SERVICE

TECHNICAL FIELD

The present invention relates to an application server, a repository device, a system, computer program products and methods for managing a service (e.g., communication service) provided to a user.

BACKGROUND

In a communication network, it is common for an application server to manage a service that is provided to a user. The service itself is often a combination of pieces of software that provide a certain functionality for the user. The functionality is usually pre-defined by the developer (e.g., network operator) of the service and remains static unless the implementation of the service is changed. However, it is common to want to change the implementation of the service after the developer has pre-defined the service. One way to change the service is to use aspect oriented programming (AOP) which is a technique that allows the implementation of the service to be changed by adding functionality to the original service without directly modifying the target application code of the original service. AOP is well known to those skilled in the art but a brief description of the basics of AOP is provided below before explaining how a feature thereof can be improved which would make it easier to add functionality to a service.

AOP is a technique in software design that helps one to implement multiple functions into an application. Often the code of these functions is heavily tangled in the sense that code pieces dedicated to one function needs to be allocated at multiple places within the code of the other functions. This property is referred to as cross-cutting of concerns. However, a clean and modular implementation of these multiple functions by separating them into dedicated and encapsulated units is frequently not possible or extremely difficult.

AOP allows the code for the application to be kept separate from the code of the cross-cutting functionality. This separate implementation is called an aspect. Applying an aspect to an application in order to add the function that is implemented by the aspect is referred to as weaving. The weaving of an aspect can be done offline and thus prior to the execution of an application. This usually means, that weaving generates a new application from the target application, by injecting the aspect code into those code locations that are referred to by the point-cuts. In addition, the weaving of an aspect can also be done online, which means that the execution of an application is monitored and once it reaches a condition that is specified by the point-cut, the aspect is executed before continuing the execution of the application.

Weaving is steered by point-cuts, which is a generic definition of those locations known as join-points within an application, where the aspect code should be added. For example, the point-cut might specify to execute the aspect at every call of a certain method. The point-cuts are based on conditions that capture points within the source code of the target application or it refers to events with the application execution. In principle this technique could allow the automatic application of a certain functionality automatically even without analyzing an application. For example, if a new application is deployed within a service execution environment, the aspects that exist within this environment could be automatically applied to this new target application. This is in particular interesting in a telecommunication context, when using services from third party service providers. These third party services might not support all the functions required by the network operator. For example, activity logging or charging might not be implemented by the third party services. Thus, with the help of AOP these features can be automatically added to the target application. The devices and methods which can accomplish this is the subject of the present invention.

SUMMARY

An application server, a repository device, a system, a computer-readable storage medium, computer program products and methods are described in the independent claims of the present application. Advantageous embodiments of the application server, the repository device, the system, the computer program products and methods are described in the dependent claims.

In one aspect, the present invention provides an application server that interfaces with at least one repository for managing a service. The application server comprises: (a) a composition entity configured to interface with the at least one repository to load a service description identifying a list of application concerns which are implemented by the service into runtime data; (b) a weaving entity configured to interface with the at least one repository to access an aspect description identifying a list of aspect concerns, where the list of aspect concerns has a unique aspect identification and each aspect concern is identified by a unique identifier (e.g., tag or keyword); and (c) the weaving entity configured to dynamically update the service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data. An advantage this is that the application servicer makes sure that aspects are only weaved into service where they are needed.

In yet another aspect, the present invention provides a method implemented by an application server which interfaces with at least one repository for managing a service. The method comprises the steps of: (a) interfacing with the at least one repository to load a service description identifying a list of application concerns which are implemented by the service into runtime data; (b) interfacing with the at least one repository to access an aspect description identifying a list of aspect concerns, where the list of aspect concerns has a unique aspect identification and each aspect concern is identified by a unique identifier (e.g., tag or keyword); and (c) dynamically updating the service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data. An advantage this is that the application servicer makes sure that aspects are only weaved into service where they are needed.

In still yet another aspect, the present invention provides a system for managing a service. The system comprises: (a) at least one repository that stores a service description identifying a list of application concerns implemented by the service; (b) the at least one repository also stores an aspect description identifying a list of aspect concerns implemented by an aspect, wherein the list of aspect concerns has a unique aspect identification and each aspect concern is identified by a unique identifier (e.g., tag or keyword); and (c) an application server which comprises: (i) a composition entity configured to load the service description identifying the list of application concerns which are implemented by the service into runtime data; (ii) a weaving entity configured to interface with the at least one repository to access an aspect description identifying a list of aspect concerns, where the list of aspect concerns has a unique aspect identification and each aspect concern is identified by the unique identifier; and (iii) the weaving entity configured to dynamically update the service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data. An advantage this is that the application servicer makes sure that aspects are only weaved into service where they are needed.

In yet another aspect, the present invention provides a repository that interfaces with an application server which provides a service. The repository comprises a storage device for storing a service description identifying a list of application concerns implemented by the service, wherein each application concern is identified by a unique identifier (e.g., tag or keyword).

In yet another aspect, the present invention provides a method implemented by a repository which interfaces with an application server which provides a service, the method comprises the step of storing a service description identifying a list of application concerns implemented by the service, wherein each application concern is identified by a unique identifier.

In yet another aspect, the present invention provides a computer program product comprising computer readable code which, when run in a computer causes the computer to perform the following: storing a service description identifying a list of application concerns implemented by a service, wherein each application concern is identified by a unique identifier (e.g., tag or keyword).

In still yet another aspect, the present invention provides a computer program product comprising computer readable code which, when run in a computer causes the computer to perform the following: (a) interfacing with the at least one repository to load a service description identifying a list of application concerns which are implemented by the service into runtime data; (b) interfacing with the at least one repository to access an aspect description identifying a list of aspect concerns, where the list of aspect concerns has a unique aspect identification and each aspect concern is identified by a unique identifier (e.g., tag or keyword); and (c) dynamically updating the service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
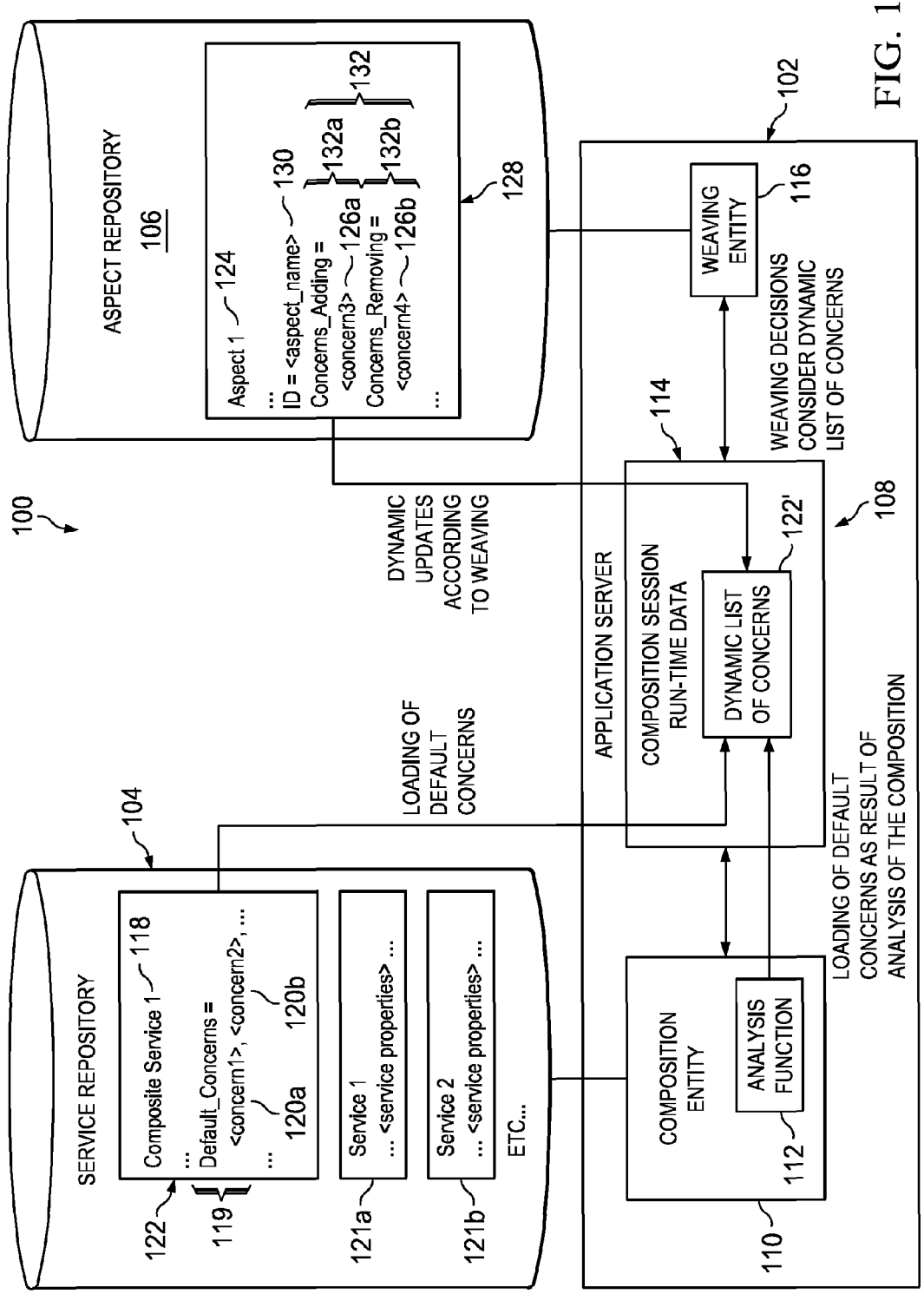
FIG. 1 is a block diagram illustrating an exemplary system including an application server, a service repository, and an aspect repository which together manage a service in accordance with an embodiment of the present invention.

An application server will be described below that with the help of AOP is capable of automatically adding functionality to an original service without directly modifying the target application code of the original service. In particular, the application server when automatically adding functionality to a certain application will automatically detect which features are still missing within the certain application code, and which are already supported. For example, if the target application code already supports charging, then the aspects which add charging support would not be applied to avoid duplicate or contradictory charging. To accomplish this, the application server is configured to dynamically describe the features and capabilities of an application to control which functions are already covered by the application code and the currently applied aspects. The application is described with a set of unique identifiers, for example tags or keywords, corresponding to the features and concerns the application is already taking care of. Also, the concerns an aspect would address are described. If the aspect is weaved into the target application code, then the list of currently addressed concerns is updated to reflect the changes applied by the aspect. When deciding if an aspect should be automatically added, this list can be consulted to see if the function the aspect provides is already covered by the application code and if the aspect is therefore unnecessary.

The application server that is configured to manage a service as described above would typically interface with one or more repository devices where both the application server and repository device(s) would have one or more of the following features (which are discussed in greater detail below):

1. A description of the concerns a service implements is defined in a service description stored within a service repository (for example) which exposes the service for usage from a particular domain (see FIG. 1). For instance, the service description can contain binding information of the service and usually describes the functions and capabilities of the service. Web Service Description Language (WSDL) is one scheme that can be used for such service descriptions.
    1.1 Where the service description of the concerns has one unique identifier (e.g., keyword/tag) per addressed concern.
2. The concerns, that an aspect implements are defined within a description of the aspect. This description is stored within an aspect repository (see FIG. 1). The aspect description states which functionality the aspect would add to (or remove from) an application, if it is applied.
    2.1 Where the aspect description of the concerns has one unique identifier (e.g., keyword/tag) per addressed concern.

2.2 Where the aspect description of a concern can express additionally if the aspect would add or remove the handling of this concern.

2.3 Multiple aspects that together implement a concern are registered within the aspect repository with a common ID (aspect group ID).

3 The list of concerns an instance of the application addresses is dynamically maintained and updated at runtime within an application server (see FIG. 1). For example, the usage of aspects might lead to changes in the concerns that are addressed by the overall application.

3.1 The default service concerns description is copied from the service repository into the application server and stored in runtime data at a service instance of a service start.

3.2 The service concerns description within the runtime data is updated throughout the execution of the service where functionality is added to or removed from this running instance dynamically e.g. by means of aspect weaving.

3.3 The update of the run-time concerns description is performed by adding or removing those concern tags that are defined for the aspect that is weaved into the application code.

3.4 If the aspect removes functionality, this is reflected in the run-time service concerns description by removal of the respective keyword/tag.

3.5 If the aspect removes functionality, this is reflected in the run-time service concerns description by adding information that marks a concern as removed.

3.6 If the policy changes, which determines which aspects for the same concern are applied, then the aspect ID that is registered with the concern might be changed/updated.

3.7 Multiple aspect IDs are stored with a single concern in the run-time concerns description if multiple aspects are weaved in that address this concern.

3.8 If a concern is implemented by multiple aspects (group of aspects), these aspects are registered with a common group ID. This aspect group ID is stored at the concern within the run-time service concerns description after weaving any of the aspects from the group.

4 The run-time service concerns description is evaluated when a decision is needed on whether an aspect is to be weaved into the application. The aspect weaving might be rejected, if the application already addresses the same concern as the aspect.

4.1 Aspect weaving might be rejected if the concerns description of the aspect contains a concern that is also in the run-time service concerns description.

4.2 If at weaving the run-time service concerns description already contains concerns that are also in the aspect concerns description, then the weaving might be allowed, if the colliding concerns were added by an earlier weaving of the aspect.

4.3 If multiple aspects for the same concern are applicable at a join point, a policy can be used to support the decision as to which aspects to apply. In this respect the policy can allow multiple aspects to be weaved although they implement the same concern.

4.4 If multiple aspects for the same concern are applicable at a join point, a policy can be used to decide about the order of the aspect application.

5 The default list of concerns of a composite service might be derived from the list of constituent services being used in the composition. This way both aspect weaving and composition might dynamically change the list of addressed concerns.

Figure 2:
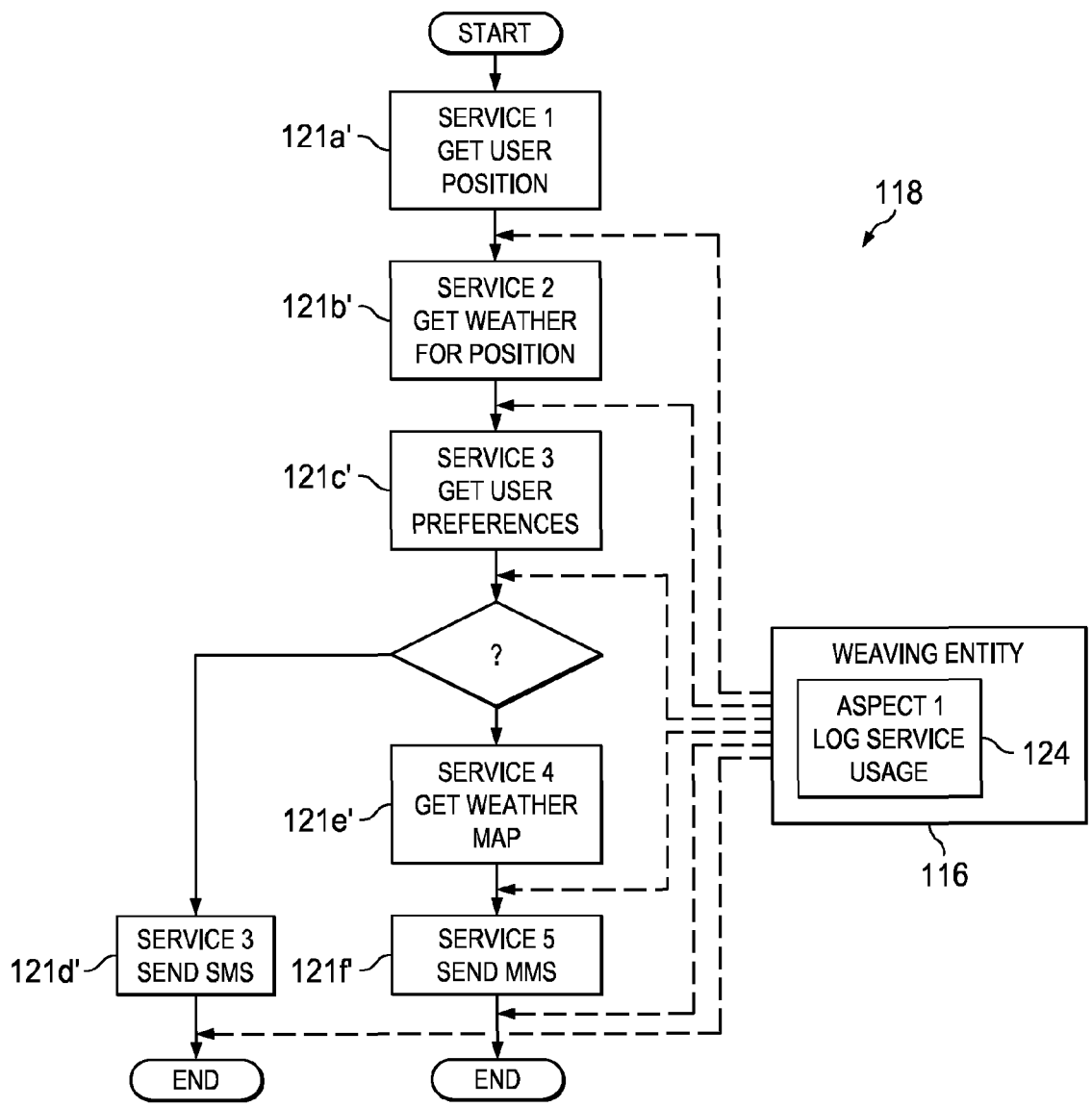
FIGS. 2-3 there are two diagrams used to help explain an exemplary weaving scenario performed in accordance with an embodiment of the present invention.
Figure 3:
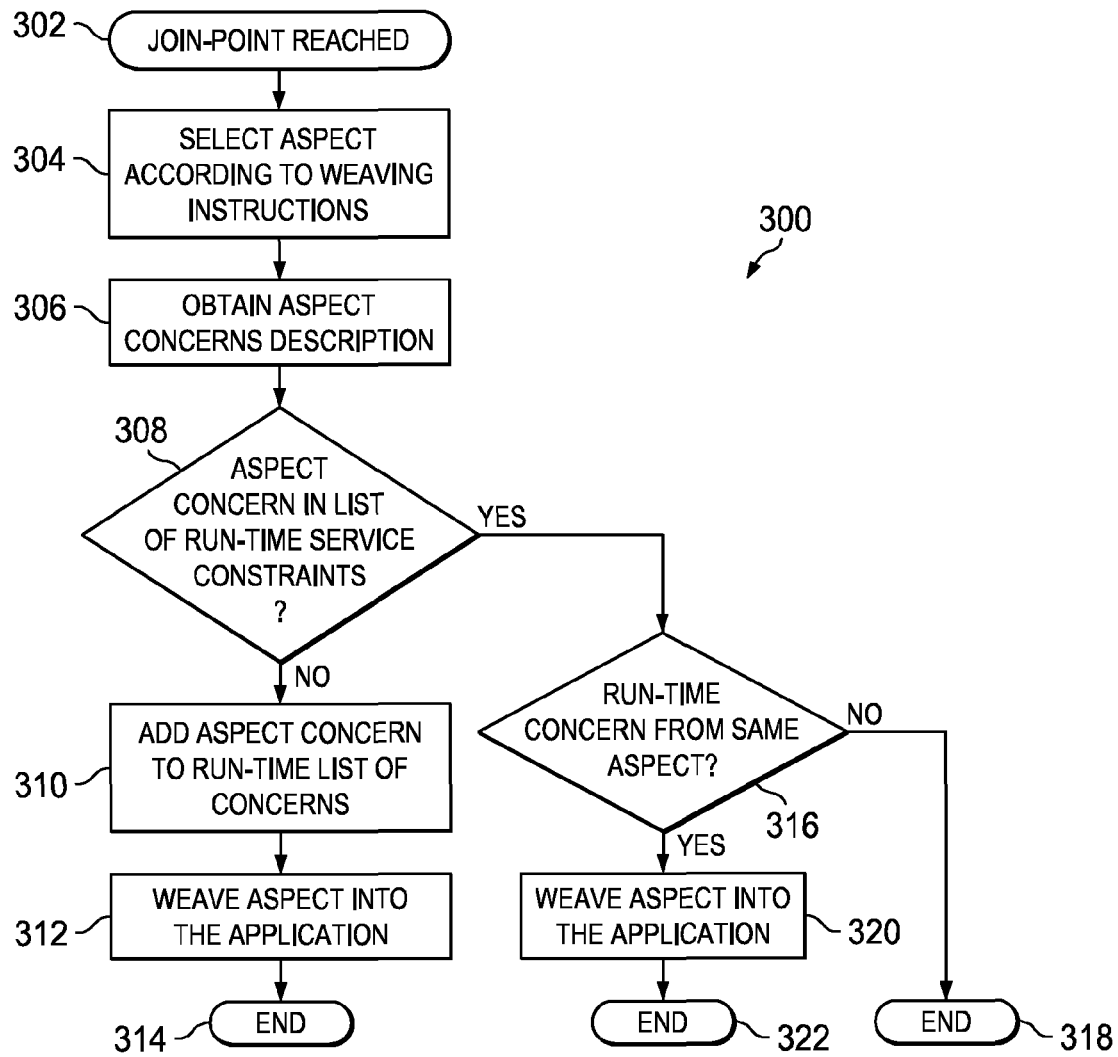

Referring to FIG. 1, there is shown a block diagram illustrating an exemplary system 100 including an application server 102, a service repository 104, and an aspect repository 106 which together manage a service 108 in accordance with an embodiment of the present invention. The application server 102 includes many components which are well known in the art but for clarity are not described herein but the components such as a composition entity 110, analysis function 112, runtime data 114, and a weaving entity 116 which are relevant to the present invention are described herein. A detailed description about the functionality of each of these components 102, 104, 106, 108, 110, 112, 114 and 116 is provided below with respect to the following topics: (1) concerns of applications and aspects (features 1.x and 2.x); (2) concern handling at execution time (features 3.x); (3) concerns influencing the weaving decision (features 4.x); (4) miscellaneous embodiments (feature 5); and (5) an exemplary scenario (FIGS. 2-3).

1. Concerns of Applications and Aspects (Features 1.x and 2.x)

The overall functionality of a service 108 comprises of a number of sub-functionalities that provide different parts of the overall application. This is in particular the case for a composite service 118, where each constituent service 121a and 121b (service 1 and service 2) provides a part of the application. A functionality that is implemented by the composite service 118 is referred to as a concern 120a and 120b. AOP in this respect is a way to modify which concerns 120a and 120b are addressed by the composite service 118.

The composite service 118 prior to any usage of AOP techniques addresses a number of concerns 120a and 120b. For example, the composite service 118 might for example handle charging for the service, but the composite service 118 might not contain support for logging. A feature of the present invention is to add a list 119 of those concerns 120a and 120b which are already covered by the application's implementation as part of a service description 122 within the service repository 104 (feature 1). In one embodiment, each concern 120a and 120b that the composite service 118 addresses can correspond to a keyword/tag (e.g., concern1, concern2). The overall set of concerns 120a and 120b is then represented by the list 119 of these keywords/tags (feature 1.1).

The aspect 124 also provides an implementation of concerns 126a and 126b. This is reflected by an aspect description 128 within the aspect repository 106. The aspect description 128 contains a unique ID 130 and a list 132 of concerns 126a and 126b associated with the aspect 124 (feature 2). In addition, the aspect description 128 states which functionality the concern 126a and 126b would add to or remove from an application, if it is applied. In one embodiment, each concern 126a and 126b that an aspect 124 addresses might be stored within the list 132 with a keyword/tag (e.g., concern3, concern4) (feature 2.1).

The concerns (e.g., concern 126a) for which the aspect 124 is able to add an implementation to an application should be distinguished from those concerns (e.g., concern 126b) for which the aspect 124 can remove from an application. In one embodiment, this can be reached by using separate lists 132a and 132b for the concerns 126a and 126b where one list 132a identifies the concerns 126a that the aspect 124 adds to an application and another list 132b identifies the concerns 126b that the aspect 124 removes from the application (feature 2.2).

An example for removing and adding concerns to an application is where the original composite service 118 might include functionality that charges the user. However, the operator might not want to have that particular method of charging and thus uses an aspect 124 (concern 126b) to remove this kind of charging. Additionally, the operator might add their preferred way of charging to the composite service 118 through another aspect 124 (concern 126a). The concerns 126a and 126b would not be called "charging" for both cases, but they would be called for example "charging_methodA" and "charging_methodB".

Each concern 126a and 126b may be implemented by multiple aspects where each of them implements a part of the concern's overall functionality. These aspects are an aspect group. They are registered in the aspect repository 106 with a common aspect group ID (feature 2.3). There are multiple ways of implementing this Aspect Group ID. For example, by adding the group ID to every aspect 124 that belongs to the particular group. Alternatively, by specifying the group ID separately as a list of all aspects 124 that belong to that particular group. Each of these approaches has its own advantages and disadvantages.

2. Concern Handling at Execution Time (Features 3.x, 4.x)

The service description 122 and the aspect description 128 as introduced in the previous section sets the environment for the execution of the service 108. The service descriptions 122 and 128 are used at the run-time of the service 108 (feature 3).

At start of execution, the application server 102 and in particular the composition engine 110 loads the service description 122 into the runtime data 114 of the service instance. In one embodiment, this can be done by copying the service description 122 from the service repository 104 into the runtime data 114 (feature 3.1). In another embodiment, the analysis function 112 could determine the service description 122 as result of an analysis of the service 108.

The run-time service concerns description 122' is updated each time an aspect 124 is weaved into the application (feature 3.2). In one embodiment, the application server 102 and in particular the weaving entity 116 does this by adding the concerns that are specified in the aspect concern description 128 to the run-time service concerns description 122' (feature 3.3).

If the aspect 124 removes functionality, then the respective concern description needs to be removed from the run-time service concern description 122' rather than added (feature 3.4). In one embodiment, the removal of a concern is performed by actually leaving it in the run-time service concern description 122' but marking that concern as removed (feature 3.5).

All concerns within the run-time service concerns description 122', which are changed during the runtime, are marked with the origin of the change. If, for example, a weaved-in aspect causes the change, then the particular concern is marked by the respective aspect ID (feature 3.6).

For a given join-point, multiple aspects might be applicable that implement a concern. For example, there might be two valid weaving instructions at a join-point that would lead to applying an aspect for charging. To avoid double charging only one of them should actually be used. In one embodiment, the weaving entity 116 selects only one aspect (for example the first aspect processed) for weaving and the other aspects for the same concern are skipped. In another embodiment, a policy can be defined to control which aspect is used (features 4.3, 4.4). If multiple aspects are used for a single concern this can be reflected in the run-time concerns description 122' by assigning multiple aspect IDs to a concern (features 3.7).

In the run-time service concerns description 122' the ID of the aspect is stored with the concern the aspect has added. This is done to make sure that the same aspect for the same concern is not blocked at different join-points. Otherwise the aspect might block itself. This can happen because the run-time service concern description 122' is updated at the first join-point. Then at the other join-points the weaving of other parts of the aspect is blocked, because the concern is already in the updated run-time service concern description 122'. Such blocking might also happen if the implementation of the concern is spread over a number of aspects intentionally. If multiple aspects are used for a single concern this can be reflected in the run-time service concerns description 122' by assigning multiple aspect IDs to a concern (feature 3.7). This allows all aspects assigned to a concern to be used at other join-points addressing the same concern.

The policy that leads to the weaving of a particular aspect might change. If this happens, then the run-time service concern description 122' might need to be updated to reflect the new policy. This update might imply the removal of aspect IDs that are assigned to concerns in the run-time service concerns description 122'. It might also lead to the replacement of the original aspect ID by the new ID of aspects that would have been selected according the new policy (feature 3.6). However, this mechanism should be used carefully to make sure not to use aspects for the rest of the execution that are incompatible with those which are used in the beginning. In addition, the replacement algorithm should consider and take into account compatibility problems. In fact, it may be better to keep a policy valid for all running composition sessions and use the new policy only for new sessions. In any case, the described replacement of policies might be required, for example, for long-running composition sessions, where neither a restart of the composition, nor further usage of the old policy is acceptable.

Sometimes the implementation of a concern needs to be distributed over multiple aspects, which in general are weaved into the application at different join-points. Such a group of aspects is described in the aspect repository 106 with a single group aspect ID. The aspect ID of the group is then also assigned to the concern within the run-time service concerns description 122' once an aspect of the group is applied. If a different aspect from the same group is about to be weaved at another join-point, this is allowed, because the aspect is described with the same aspect group ID as was already assigned to the concern (feature 3.8).

3. Concerns Influencing the Weaving Decision (Features 4.x)

At runtime, aspects 124 are weaved into the application and at each join-point the weaving entity 116 needs to take the decision on whether the aspect 124 can be weaved in or not. The weaving entity 116 skips the weaving of the aspect 124 if the concerns 126a or 126b that the aspect 124 implements are already present in the target application. For this purpose, the aspect concerns description 128 as stored within the aspect repository 106 is compared to the run-time service concerns description 122'. If the aspect concerns 126a or 126b are already in the run-time data 114, then the weaving might be skipped.

An aspect 124 might be weaved in at multiple join-points throughout the application. This means, further weaving must not always be rejected, just because the run-time service concerns description 122' was updated at first weaving. It should be allowed, if the further weaving can be associated to the same aspect 124. This is reached by not only storing the aspect concerns description tags in a run-time service capability list, but also the aspect ID 130 would be stored with the particular concern 120a and 120b. At further weaving of the same aspect 124, the weaving entity 116 finds matching concerns descriptions in the runtime data 114 and the aspect description 128, but the weaving is allowed if the conflicting concern was added by an aspect 124 with the same aspect ID 130.

When taking the decision about the aspects 124 to be weaved in at a join-point, multiple aspects 124 for the same concern 120a and 120b might be applicable. In one embodiment, a policy provides rules regarding which aspect 124 to choose. For example, the policy might specify to take the first aspect 124 that is considered. For another concern 120a and 120b the last aspect that is applicable for the join-point might be selected. The policy might also allow multiple aspects 124 to be weaved in for a concern 120a and 120b, and then determine the order of aspect weaving/execution.

4. Miscellaneous Embodiments (Feature 5)

As shown in FIG. 1, the constituent services 121a and 121b that are available for composition and the aspects 124 that are available for weaving, are registered within separate repositories 104 and 106. If desired, only one repository can exist for both the composite service 118 (including the constituent services 121a and 121b) and aspects 124. The definition of a concrete ontology for the service and aspect concerns descriptions 122 and 128 would be domain specific.

In one embodiment, the list 119 of default concerns 120a and 120b might be pre-defined for a composite service 118 and stored within the service repository 104. In another embodiment, the list 119 of concerns 120a and 120b that the composite service 118 is already addressing might be generated automatically by the analysis function 112 which analyzes the composition service 118 with respect to the constituent services 121a and 121b which are needed to instantiate this composition service 118 (feature 5).

5. Exemplary Scenario (FIGS. 2-3)

Within a service composition environment, online weaving can be used to apply aspects 124 to a composite service 118. In the example shown in FIG. 2, an aspect 124 is used that adds logging of all used constituent services 121a', 121b', 121c', 121d', 121e' and 121f' to the composite service application 118. This means, that the logging aspect 124 shall be invoked after each service selection within the composite service 118. Thus, the weaving entity 116 at each join-point takes a decision according to the weaving decision logic which is shown in the flowchart associated with FIG. 3.

Referring to FIG. 3, there is a flowchart illustrating the weaving decision logic 300 that is performed by the weaving entity 116 to implement the exemplary service shown in FIG. 2. The weaving entity 116 after reaching a join-point (step 302) functions to select an aspect 124 according to weaving instructions (step 304) and obtain the aspect concerns description 128 (step 306). Then, the weaving entity 116 determines if the aspect concern is in a list of run-time service constraints (step 308) where if the result is no then the aspect concern is added to the run-time list of service concerns 122' (step 310) and the aspect 124 is weaved into the application (step 312) before ending (step 314). If the weaving entity 116 determines the aspect is indeed in the list of run-time service constraints (step 308) then determine if the run-time concern is from same aspect 124 (step 316) if the result is no then end (step 318) and if the result is yes then weave the aspect 124 into the application (step 320) and then end (step 322). In the current example, the service does not support logging. Logging is added by aspects at run-time. The first time, assume when a join-point is reached, where the logging aspect shall be applied, the weaving entity 116 determines that a logging concern is not in the list of those concerns that are already addressed by the application (step 308). The aspect is applied and the list of addressed concerns for this service instance is updated (steps 310 and 312). At the next join-point when applying again the logging aspect (step 308), the weaving entity 116 finds that a concern of the logging aspect is already within the list of addressed concerns. As this logging concern was added by an aspect of the same ID, the weaving entity 116 decides to allow the usage of this aspect again (step 320). If another aspect is tried, that would also apply logging, then the weaving entity 116 would reject the weaving to avoid two independent aspects from addressing the same concern (step 318).

From the foregoing, one skilled in the art will appreciate that the present invention is aimed, at least, to minimize the aforementioned drawbacks associated with the prior art and to provide a central building block of an overall aspect oriented service management environment. In such an environment, the weaving language allows to define weaving globally across multiple applications and services. The present invention helps to make sure, that aspects are only weaved into applications where they are needed. Especially if new applications are added to the environment, the mechanisms described herein might allow automatic application of aspects without changing the global weaving instructions, because the application server can decide automatically and dynamically, if and which aspects are to be weaved into this application. The operator of such a service environment can provide global weaving instructions expressing their requirements regarding the functionality of an application. The mechanisms and features described herein also help to add this functionality by means of aspect weaving to applications that do not contain support for them. Applications that are already compliant to these requirements are automatically excluded from weaving.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An application server comprising a processor that interfaces with at least one repository for managing a service, the application server comprising:
   a communication interface for communicating with said at least one repository, said at least one repository comprising a storage device;
   a composition entity configured to interface with the at least one repository to load a service description identifying a list of application concerns which are implemented by the service into runtime data;
   a weaving entity configured to interface with the at least one repository to access an aspect description identifying a list of aspect concerns, where the list of aspect concerns has a unique aspect identification and each aspect concern is identified by a unique identifier;

the weaving entity configured to dynamically update a run-time service description of the application concerns in the runtime data throughout execution of the service, wherein during aspect weaving at a join-point an update of the run-time service description of the application concerns in the runtime data is performed by adding, removing or marking as removed the unique identifier defined for the aspect concern that is weaved into the application concerns in the runtime data.

2. The application server of claim 1, wherein the weaving entity is configured to mark one of the application concerns in the runtime data with the unique aspect identification when the aspect weaving caused a change in that application concern.

3. The application server of claim 1, wherein the weaving entity is configured to implement a policy where if more than one aspect is applicable to implement one application concern in the runtime data then the policy selects one of those aspects for weaving and skips the other aspects.

4. The application server of claim 3, wherein the weaving entity when the policy changes updates unique aspect identifications in the service description of the application concerns in the runtime data in accordance with a new policy.

5. The application server of claim 3, wherein the weaving entity is configured to store multiple unique aspect identifications with one of the application concerns in the runtime data if multiple aspects are weaved-in that address the one application concern.

6. The application server of claim 1, wherein the weaving entity is configured to consult the service description when deciding if one of the aspect concerns is to be added and if a function of the one aspect concern is already covered in the service then the one aspect concern is not weaved into the application concerns in the runtime data.

7. The application server of claim 1, wherein the list of aspect concerns comprises a separate list of the aspect concerns that an aspect adds to the service and another separate list of the aspect concerns that the aspect removes from the service.

8. The application server of claim 1, wherein the weaving entity is configured to mark one of the application concerns in the runtime data with the unique aspect identification when the aspect weaving caused a change in that application concern and if a different aspect concern having the same unique aspect identification is about to be weaved at another join-point then allowing this because the different aspect concern is described with the same unique aspect identification.

9. The application server of claim 1, wherein the unique identifier comprises a tag or keyword.

10. A method implemented by an application server which interfaces with at least one repository for managing a service, the method comprising:
interfacing with the at least one repository to load a service description identifying a list of application concerns which are implemented by the service into runtime data;
interfacing with the at least one repository to access an aspect description identifying a list of aspect concerns, where the list of aspect concerns has a unique aspect identification and each aspect concern is identified by a unique identifier; and
dynamically updating a run-time service description of the application concerns in the runtime data throughout execution of the service, wherein during aspect weaving at a join-point an update of the run-time service description of the application concerns in the runtime data is performed by adding, removing or marking as removed the unique identifier defined for the aspect concern that is weaved into the application concerns in the runtime data.

11. The method of claim 10, wherein the list of aspect concerns comprises a separate list of the aspect concerns that an aspect adds to the service and another separate list of the aspect concerns that the aspect removes from the service.

12. The method of claim 10, wherein the dynamically updating step further comprises marking one of the application concerns in the runtime data with the unique aspect identification when the aspect weaving caused a change in that application concern.

13. The method of claim 10, wherein the dynamically updating step further comprises implementing a policy where if more than one aspect is applicable to implement one application concern in the runtime data then the policy selects one of those aspects for weaving and skips the other aspects.

14. The method of claim 13, wherein if the policy changes then unique aspect identifications in the service description of the application concerns in the runtime data are updated in accordance with a new policy.

15. The method of claim 13, wherein the dynamically updating step further comprises storing multiple unique aspect identifications with one of the application concerns in the runtime data if multiple aspects are weaved-in that address the one application concern.

16. The method of claim 10, wherein the dynamically updating step further comprises marking one of the application concerns in the runtime data with the unique aspect identification when the aspect weaving caused a change in that application concern and if a different aspect concern having the same unique aspect identification is about to be weaved at another join-point then allowing this because the different aspect concern is described with the same unique aspect identification.

17. The method of claim 10, wherein the dynamically updating step further comprises consulting the service description when deciding if one of the aspect concerns is to be added and if a function of the one aspect concern is already covered in the service then the one aspect concern is not weaved into the application concerns in the runtime data.

18. The method of claim 10, wherein the unique identifier comprises a tag or keyword.

19. A system for managing a service, the system comprising:
at least one repository, said at least one repository comprising a storage device that stores a service description identifying a list of application concerns implemented by the service, the at least one repository also stores an aspect description identifying a list of aspect concerns implemented by an aspect, wherein the list of aspect concerns has a unique aspect identification and each aspect concern is identified by a unique identifier; and
an application server comprising a processor including:
a composition entity configured to load the service description identifying the list of application concerns which are implemented by the service into runtime data;
a weaving entity configured to interface with the at least one repository to access the aspect description identifying the list of aspect concerns, where the list of aspect concerns has the unique aspect identification and each aspect concern is identified by the unique identifier; and
the weaving entity configured to dynamically update a run-time service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data.

20. The system of claim 19, wherein the weaving entity is configured to mark one of the application concerns in the runtime data with the unique aspect identification when the aspect weaving caused a change in that application concern.

21. The system of claim 19, wherein the weaving entity is configured to implement a policy where if more than one aspect is applicable to implement one application concern in the runtime data then the policy selects one of those aspects for weaving and skips the other aspects.

22. The system of claim 21, wherein the weaving entity when the policy changes updates unique aspect identifications in the service description of the application concerns in the runtime data in accordance with a new policy.

23. The system of claim 21, wherein the weaving entity is configured to store multiple unique aspect identifications with one of the application concerns in the runtime data if multiple aspects are weaved-in that address the one application concern.

24. The system of claim 19, wherein the weaving entity is configured to consult the service description when deciding if one of the aspect concerns is to be added and if a function of the one aspect concern is already covered in the service then the one aspect concern is not weaved into the application concerns in the runtime data.

25. The system of claim 19, wherein the list of aspect concerns comprises a separate list of the aspect concerns that an aspect adds to the service and another separate list of the aspect concerns that the aspect removes from the service.

26. The system of claim 19, wherein the weaving entity is configured to mark one of the application concerns in the runtime data with the unique aspect identification when the aspect weaving caused a change in that application concern and if a different aspect concern having the same unique aspect identification is about to be weaved at another join-point then allowing this because the different aspect concern is described with the same unique aspect identification.

27. The system of claim 19, wherein the unique identifier comprises a tag or keyword.

28. A repository that interfaces with an application server which provides a service, the repository comprising:
   a service description identifying a list of application concerns which are implemented by the service to load the service description into runtime data;
   an aspect description identifying a list of aspect concerns implemented by an aspect, wherein the list of aspect concerns has a unique aspect identification and each aspect concern is identified by a unique identifier;
   an interface for providing access to the aspect description so as to allow the application server to dynamically update a run-time service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data; and
   a hardware storage device for storing the service description of application.

29. The repository of claim 28, wherein the unique identifier comprises a tag or keyword.

30. A method implemented by a repository which interfaces with an application server which provides a service, the method comprising:
   storing a service description identifying a list of application concerns which are implemented by the service to load the service description into runtime data;
   storing an aspect description identifying a list of aspect concerns implemented by an aspect, wherein the list of aspect concerns has a unique aspect identification and each aspect concern is identified by a unique identifier; and
   providing access to the aspect description so as to allow the application server to dynamically update a run-time service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data.

31. The method of claim 30, wherein the unique identifier comprises a tag or keyword.

32. A non-transitory computer-readable storage medium that stores computer-executable process steps for an application server which interfaces with at least one repository to manage a service, said computer-executable process steps causing a computer to perform the steps of:
   interfacing with the at least one repository to load a service description identifying a list of application concerns which are implemented by the service into runtime data;
   interfacing with the at least one repository to access an aspect description identifying a list of aspect concerns, where the list of aspect concerns has a unique aspect identification and each aspect concern is identified by a unique identifier; and
   dynamically updating a run-time service description of the application concerns in the runtime data throughout execution of the service, wherein during aspect weaving at a join-point an update of the run-time service description of the application concerns in the runtime data is performed by adding, removing or marking as removed the unique identifier defined for the aspect concern that is weaved into the application concerns in the runtime data.

33. A non-transitory computer-readable storage medium that stores computer-executable process steps for a repository which interfaces with an application server which provides a service, said computer-executable process steps causing a computer to perform the steps of:
   storing a service description identifying a list of application concerns which are implemented by the service to load the service description into runtime data;
   storing an aspect description identifying a list of aspect concerns implemented by an aspect, wherein the list of aspect concerns has a unique aspect identification and each aspect concern is identified by a unique identifier; and
providing access to the aspect description so as to allow the application server to dynamically update a run-time service description of the application concerns in the runtime data throughout execution of the service, wherein during aspect weaving at a join-point an update of the service description of the application concerns in the runtime data is performed by adding, removing or marking as removed the unique identifier defined for the aspect concern that is weaved into the application concerns in the runtime data.

* * * * *